US011996219B2

United States Patent
Sakuma et al.

(10) Patent No.: US 11,996,219 B2
(45) Date of Patent: May 28, 2024

(54) MAGNETIC MATERIAL AND MANUFACTURING METHOD THEREOF

(71) Applicant: TOYOTA JIDOSHA KABUSHIKI KAISHA, Toyota (JP)

(72) Inventors: Noritsugu Sakuma, Mishima (JP); Tetsuya Shoji, Susono (JP); Akihito Kinoshita, Mishima (JP); Akira Kato, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 48 days.

(21) Appl. No.: 17/478,043

(22) Filed: Sep. 17, 2021

(65) Prior Publication Data

US 2022/0102033 A1 Mar. 31, 2022

(30) Foreign Application Priority Data

Sep. 25, 2020 (JP) ................................ 2020-161302

(51) Int. Cl.
*H01F 1/057* (2006.01)
*H01F 41/02* (2006.01)

(52) U.S. Cl.
CPC ......... *H01F 1/057* (2013.01); *H01F 41/0253* (2013.01)

(58) Field of Classification Search
CPC ............................ H01F 1/057; H01F 41/0253
See application file for complete search history.

(56) References Cited

U.S. PATENT DOCUMENTS

| | | | |
|---|---|---|---|
| 4,765,848 | A | 8/1988 | Mohri et al. |
| 2021/0065973 | A1 | 3/2021 | Yokota et al. |

FOREIGN PATENT DOCUMENTS

| | | | |
|---|---|---|---|
| JP | 61-159708 | A | 7/1986 |
| JP | 2020-031144 | A | 2/2020 |
| JP | 2020031144 | A * | 2/2020 |
| JP | 2020-107849 | A | 7/2020 |
| JP | 2021-040126 | A | 3/2021 |

OTHER PUBLICATIONS

JP-2020031144-A: Espacenet English machine translation (Year: 2020).*

* cited by examiner

*Primary Examiner* — Adil A. Siddiqui
(74) *Attorney, Agent, or Firm* — Sughrue Mion, PLLC

(57) ABSTRACT

A magnetic material according to the present disclosure includes a main phase having an $R_2T_{14}B$ type crystal structure (R is a rare earth element and T is a transition metal element). The main phase has a composition represented by $((Nd, Pr)_{(1-x-y)}La_xR^1{}_y)_2((Fe_{(1-z-w)}(Co, Ni)_zM_w))_{14}B$ (where, $R^1$ is a rare earth element other than Nd, Pr, and La, M is an element other than Fe, Co, Ni, and a rare earth element, and the like, and $0.25 \le x \le 1.00$, $0 \le y \le 0.10$, $0.15 \le z \le 0.40$, and $0 \le w \le 0.1$ are satisfied). A manufacturing method of the magnetic material according to the present disclosure includes melting a raw material containing the elements constituting the main phase and solidifying the melted raw material.

9 Claims, 2 Drawing Sheets

MAGNETIC MATERIAL AND MANUFACTURING METHOD THEREOF

CROSS-REFERENCE TO RELATED APPLICATION

This application claims priority to Japanese Patent Application No. 2020-161302 filed on Sep. 25, 2020, incorporated herein by reference in its entirety.

BACKGROUND

1. Technical Field

The present disclosure relates to a magnetic material and a manufacturing method thereof. The present disclosure particularly relates to an R—Fe—B-based (R is a rare earth element) magnetic material.

2. Description of Related Art

The R—Fe—B-based magnetic material has a main phase having an $R_2T_{14}B$ type crystal structure (T is a transition metal element). High residual magnetization is obtained due to this main phase.

Among the R—Fe—B-based magnetic materials, the most common material having an excellent balance between performance and price is an Nd—Fe—B-based magnetic material (neodymium magnetic material) in which Nd is selected as R. Therefore, the Nd—Fe—B-based magnetic materials are sharply widespread, and it is expected that a usage amount of Nd will continue to be sharply increased, and there is a possibility that the usage amount of Nd exceeds a reserve thereof in the future. Therefore, an attempt is made to substitute a part or all of Nd with a light rare earth element, such as Ce, La, Y, and Sc.

For example, Japanese Unexamined Patent Application Publication No. 2020-107849 (JP 2020-107849 A) discloses a magnetic material obtained by using an Nd—Fe—B-based magnetic material in which a part of Nd is substituted with La and/or Ce as a precursor, and diffusing and permeating, inside the precursor, a modifying material containing a rare earth element other than a light rare earth element. Note that unless otherwise specified, "and/or" in the present specification means "at least one".

Further, for example, Japanese Unexamined Patent Application Publication No. 2020-31144 (JP 2020-31144 A) discloses an Nd—Fe—B-based magnetic material in which a part of Nd is substituted with La and/or Ce, and optionally, a part of Fe is substituted with a small amount of Co.

Further, for example, Japanese Unexamined Patent Application Publication No. 61-159708 (JP 61-159708 A) discloses an R—Fe—B-based magnetic material in which a part or all of Nd is substituted with La and/or Ce.

SUMMARY

In the Nd—Fe—B-based magnetic material, high saturation magnetization can be obtained as compared with other magnetic materials, and thus the Nd—Fe—B-based magnetic material is often used in a high-powered motor and the like. The magnetic material used in the high-powered motor and the like is often exposed to a high temperature due to the heat generated by the motor and the like.

A magnetic characteristic of the magnetic material is decreased as the temperature rises, and magnetism disappears at a Curie temperature. It is known that in the Nd—Fe—B-based magnetic material, the magnetic characteristic is sharply decreased due to a rise in the temperature as compared with other magnetic materials.

In a case where a part or all of Nd is easily substituted with the light rare earth element in order to reduce the usage amount of Nd, the magnetic characteristic at the high temperature, particularly coercive force at the high temperature, is significantly decreased. The magnetic materials disclosed in JP 2020-107849 A, JP 2020-31144 A, and JP 61-159708 A improve the coercive force at the high temperature by optimizing a type of the light rare earth element and a rate of substitution thereof.

On the other hand, since the Nd—Fe—B-based magnetic material has relatively high saturation magnetization at the high temperature, even in a case where the saturation magnetization at the high temperature is decreased due to the substitution of a part or all of Nd with the light rare earth element, there are few problems in practical use. However, in recent years, the high-output characteristics and miniaturization of the motor and the like are sharply advanced, and the decrease in the saturation magnetization at the high temperature cannot be ignored. Therefore, the present inventors have found that, even in a case where a part or all of Nd is substituted with the light rare earth element, it is desired to suppress the decrease in the saturation magnetization at the high temperature within a range in which there is no problem in practical use or to further improve the saturation magnetization at the high temperature.

A magnetic material and a manufacturing method thereof according to the present disclosure have been made in order to solve the above problems. The present disclosure is to provide an R—Fe—B-based magnetic material and a manufacturing method thereof in which, even in a case where a usage amount of Nd is decreased, the decrease in the saturation magnetization at the high temperature is suppressed within a range in which there is no problem in practical use or the saturation magnetization at the high temperature is further improved. Note that in the present specification, unless otherwise specified, "high temperature" means 373 K to 473 K.

The present inventors have made extensive studies and completed a magnetic material and a manufacturing method thereof according to the present disclosure. The magnetic material and a manufacturing method thereof according to the present disclosure include the following aspects.

<1> A magnetic material including a main phase having an $R_2T_{14}B$ type crystal structure (where, R is a rare earth element and T is a transition metal element), in which the main phase has a composition represented by a molar ratio formula $((Nd, Pr)_{(1-x-y)}La_xR^1{}_y)_2((Fe_{(1-z-w)}(Co, Ni)_zM_w))_{14}B$ (where, $R^1$ is one or more rare earth elements other than Nd, Pr, and La, M is one or more elements other than Fe, Co, Ni, and a rare earth element, and an unavoidable impurity element, and $0.25 \le x \le 1.00$, $0 \le y \le 0.10$, $0.15 \le z \le 0.40$, and $0 \le w \le 0.1$ are satisfied).

<2> The magnetic material according to <1>, in which the x satisfies $0.25 \le x \le 0.61$.

<3> The magnetic material according to <1> or <2>, in which a volume fraction of the main phase is 80.0% to 100%.

<4> The magnetic material according to any one of <1> to <3>, in which a lattice volume of the main phase is 0.930 $nm^3$ to 0.955 $nm^3$.

<5> The magnetic material according to any one of <1> to <4>, in which a density of the main phase is 7.00 $g/cm^3$ to 7.90 $g/cm^3$.

<6> A manufacturing method of the magnetic material according to <1>, the method including melting a raw material containing the elements constituting the main phase and solidifying the melted raw material.

<7> The method according to <6>, in which an ingot obtained by melting the raw material and solidifying the melted raw material is subjected to heat treatment at 1273 K to 1573 K for 6 hours to 72 hours.

According to the present disclosure, it is possible to provide the R—Fe—B-based magnetic material in which even in a case where the usage amount of Nd is decreased, by selecting La as the light rare earth element and substituting a part of Fe with Co and/or Ni having a molar ratio within a predetermined range, the decrease in the saturation magnetization at the high temperature is suppressed within a range in which there is no problem in practical use or the saturation magnetization at the high temperature is further improved.

Further, according to the present disclosure, it is possible to provide the manufacturing method of the R—Fe—B-based magnetic material in which even in a case where the usage amount of Nd is decreased, by selecting La as the light rare earth element and substituting a part of Fe with Co and/or Ni having a molar ratio within a predetermined range, the decrease in the saturation magnetization at the high temperature is suppressed within a range in which there is no problem in practical use or the saturation magnetization at the high temperature is further improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
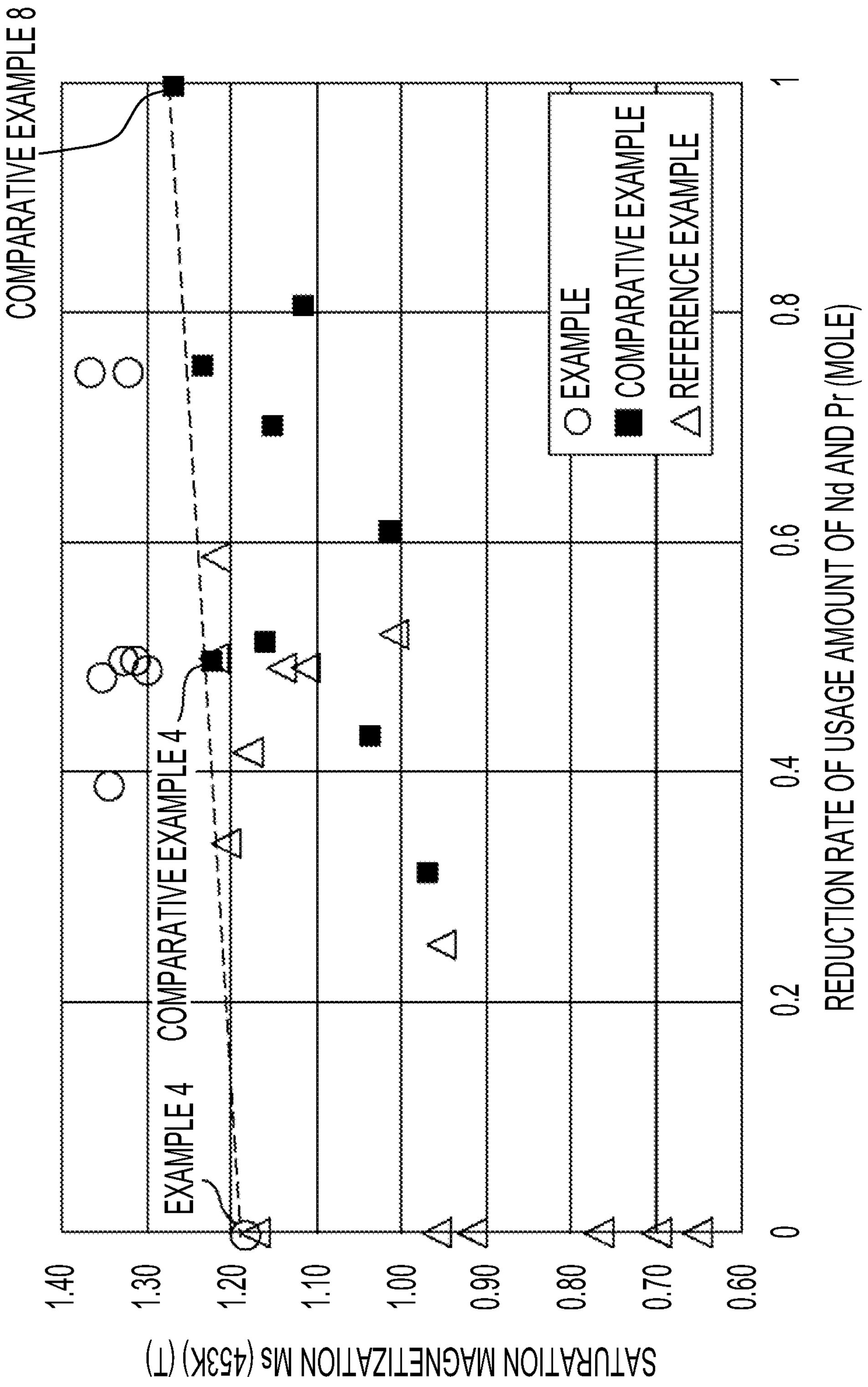
FIG. 1 is a graph showing a relationship between a reduction rate of a usage amount of Nd and Pr and saturation magnetization Ms at a high temperature (453 K)

Hereinafter, embodiments of a magnetic material and a manufacturing method thereof according to the present disclosure will be described in detail. Note that the embodiments shown below do not limit the magnetic material according to the present disclosure and the manufacturing method thereof.

Although not restricted by theory, a reason why even in a case where a usage amount of Nd is decreased, a decrease in saturation magnetization at a high temperature can be suppressed within a range in which there is no problem in practical use or the saturation magnetization at the high temperature is further improved will be described below.

An R—Fe—B-based magnetic material has a main phase having an $R_2T_{14}B$ type crystal structure. R is a rare earth element and T is a transition metal element. In the main phase having the $R_2T_{14}B$ type crystal structure, a composition of the most representative main phase is represented by $Nd_2Fe_{14}B$. Hereinafter, a phase having such a composition may be referred to as an "$Nd_2Fe_{14}B$ phase".

In the related art, it has been practiced to substitute a part of Nd in the $Nd_2Fe_{14}B$ phase with a light rare earth element in order to reduce the usage amount of Nd. On the other hand, it has been known that a phase in which all of R in an $R_2Fe_{14}B$ phase are La, that is, an $La_2Fe_{14}B$ phase is very unstable. Therefore, in the related art, the selection of La as an element in order to reduce the usage amount of Nd has been avoided as much as possible. Even in a case where La is selected, the light rare earth element other than La, particularly Ce, has been selected together to decrease a content ratio (substitution ratio) of La as much as possible.

However, even in a case where a part of Nd is substituted with La having a predetermined molar ratio or more, a part of Fe is substituted with Co and/or Ni having a molar ratio within a predetermined range, so that a phase having the $R_2T_{14}B$ type crystal structure can be stabilized. Further, the decrease in saturation magnetization at the high temperature can be suppressed within a range in which there is no practical problem, or the saturation magnetization at the high temperature can be further improved.

Further, although not restricted by theory, the reason why the decrease in the saturation magnetization at the high temperature can be suppressed within a range in which there is no problem in practical use or the saturation magnetization at the high temperature can be further improved in the above-described manner is as follows.

In the magnetic material in which a part of Nd is substituted with Ce in order to reduce the usage amount of Nd, in the related art, in many cases, even in a case where a part of Fe is substituted with Co, the magnetic characteristic at the high temperature, particularly the saturation magnetization, has been not particularly improved. The reason of the above is considered that in a case where a part of Fe is substituted with Co, even when a Curie temperature rises, the magnetic characteristic in a high temperature range until the Curie temperature is reached, particularly the saturation magnetization, is not always improved.

As described above, in a case where a part of Nd is substituted with the light rare earth element in order to reduce the usage amount of Nd, in the related art, the substitution with La has been avoided as much as possible due to the instability of the $La_2Fe_{14}B$ phase. However, the present inventors dare to select La as R of the phase (main phase) having the $R_2T_{14}B$ type crystal structure, and substitute a part of Fe with Co within a predetermined range to stabilize the phase (main phase) having the $R_2T_{14}B$ type crystal structure.

It is considered that the stabilization of the phase (main phase) having the $R_2T_{14}B$ type crystal structure can be described by an ionic radius of each constituent element that has a great influence on the crystal structure. The ionic radii of Nd, Ce, La, Pr, Fe, Co, and Ni are shown in Table 1.

TABLE 1

($\times 10^{-1}$ nm)

| Nd | Ce | La | Pr | Fe | Co | Ni |
|---|---|---|---|---|---|---|
| 1.123 | 1.01 | 1.172 | 1.13 | 0.785 | 0.75 | 0.74 |

As can be understood from Table 1, the ionic radius of La is large as compared with the ionic radius of Nd. Therefore, in a case where a part of Nd is substituted with La, the stability of the phase (main phase) having the $R_2T_{14}B$ type crystal structure is likely to be impaired. In particular, in a case where all of Nd are substituted with La, the stability of the phase (main phase) having an $R_2T_{14}B$ type crystal structure is greatly impaired. Therefore, as described above, the $La_2Fe_{14}B$ phase (the phase (main phase) having the $R_2T_{14}B$ type crystal structure that is substantially constituted of solely La, Fe, and B) is unstable.

However, even in a case where a part or all of Nd is substituted with La, when a part of Fe is substituted with Co, the phase (main phase) having the $R_2T_{14}B$ type crystal structure can be stabilized. The reason of the above is considered that the ionic radius of Co is small as compared with the ionic radius of Fe, and thus the crystal structure expanded by substituting a part or all of Nd with La can be appropriately decreased by substituting a part of Fe with Co.

Then, even in a case where a part or all of Nd is substituted with La, when the phase (main phase) having the $R_2T_{14}B$ type crystal structure is stable, the saturation magnetization of the phase (main phase) at the high temperature is not inferior or rather superior to the saturation magnetization of the $Nd_2Fe_{14}B$ phase. Specifically, the saturation magnetization of $La_2(Fe, Co)_{14}B$ phase at the high temperature is not inferior to the saturation magnetization of $Nd_2Fe_{14}B$ phase at the high temperature. In addition, the saturation magnetization of the $(Nd, La)_2(Fe, Co)_{14}B$ phase at the high temperature is rather high as compared with the saturation magnetization of $Nd_2Fe_{14}B$ phase at the high temperature. Note that the "$Nd_2Fe_{14}B$ phase" means a phase having the $R_2T_{14}B$ type crystal structure that is substantially constituted of solely Na, Fe, and B. The "$La_2(Fe, Co)_{14}B$ phase" means a phase in which substantially all of Nd are substituted with La and a part of Fe is substituted with Co. The "$(Nd, La)_2(Fe, Co)_{14}$ B phase" means a phase in which a part of Nd is substituted with La and a part of Fe is substituted with Co. "Not inferior" means that the decrease in the saturation magnetization at the high temperature is within a range in which there is no problem in practical use as compared with the saturation magnetization of the $Nd_2Fe_{14}B$ phase at the high temperature.

As described above, in the magnetic material of the related art in which a part of Nd is substituted with Ce and a part of Fe is substituted with Co, the saturation magnetization at the high temperature is not always improved (including a case of "not inferior"). From the above, it is considered that in the magnetic material according to the present disclosure in which a part or all of Nd is substituted with La and a part of Fe is substituted with Co, the saturation magnetization at the high temperature is not improved due to an rise in the Curie temperature due to Co, but rather the saturation magnetization at the high temperature is improved due to a physical property of La (including a case of "not inferior"). That is, it is considered that in the magnetic material according to the present disclosure, the saturation magnetization at the high temperature is not improved due to the rise in the Curie temperature by substituting a part of Fe with Co, the saturation magnetization at the high temperature is improved due to the physical property of La. Further, it is considered that Co in the magnetic material according to the present disclosure contributes to the stabilization of the $La_2(Fe, Co)_{14}B$ phase and/or the $(Nd, La)_2(Fe, Co)_{14}B$ phase.

It is known that Pr has a similar physical property as Nd, and as can be understood from Table 1, the ionic radius of Nd and the ionic radius of Pr are close to each other. From the above, in the magnetic material according to the present disclosure, Nd and Pr can be treated as equivalent elements.

It is known that Fe, Co, and Ni have similar physical properties as iron group elements. Further, as for Co and Ni among these iron group elements, as can be understood from Table 1, the ionic radius of Co and the ionic radius of Ni are close to each other. From the above, in the magnetic material according to the present disclosure, Co and Ni can be treated as equivalent elements.

The constituent requirements, that is based on the above, of the magnetic material and the manufacturing method thereof according to the present disclosure will be described below.

Magnetic Material

The magnetic material according to the present disclosure including the main phase having the $R_2T_{14}B$ type crystal structure expresses the magnetism due to the main phase. Hereinafter, the main phase will be described.

Crystal Structure of Main Phase

The main phase has the $R_2T_{14}B$ type crystal structure. R is a rare earth element and T is a transition metal element. The crystal structure of the main phase can be identified by performing, for example, an X-ray diffraction analysis with respect to the magnetic material according to the present disclosure.

Note that in the present specification, the rare earth elements include 17 elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Lu).

Composition of Main Phase

The main phase has a composition represented by is a molar ratio formula $((Nd, Pr)_{(1-x-y)}La_xR^1{}_y))_2((Fe_{(1-z-w)}(Co, Ni)_zM_w))_{14}B$. Nd is neodymium, Pr is praseodymium, La is lanthanum, Fe is iron, Co is cobalt, and Ni is nickel. $R^1$ is one or more rare earth elements other than Nd, Pr, and La. M is one or more elements other than Fe, Co, Ni, and the rare earth element, and an unavoidable impurity element. In the above formula, for convenience of description, $(Nd, Pr)_{(1-x-y)}La_xR^1{}_y$ may be referred to as a rare earth site, $(Fe_{(1-z-w)}(Co, Ni)_zM_w$ may be referred to as an iron group site.

As can be understood from the above formula, the main phase contains 2 mol of one or more elements in the rare earth site, 14 mol of one or more elements in the iron group site, and 1 mol of boron (B). That is, one or more elements in the rare earth site, one or more elements in the iron group site, and boron constitute a phase having the crystal structure described above.

The rare earth site consists of Nd, Pr, La, and $R^1$, and the sum of Nd and Pr, La, and $R^1$ are present in a molar ratio of (1−x−y):x:y. An expression (1−x−y)+x+y=1 means that a part of Nd and/or Pr is substituted with one or more elements selected from the group consisting of La and $R^1$.

The iron group site consists of Fe, Co, Ni, and M, and the sum of Fe, Co, and Ni, and M are present in a molar ratio of (1−z−w):z:w. An expression (1−z−w)+z+w=1 means that a part of Fe is substituted with one or more elements selected from the group consisting of Co, Ni, and M.

Hereinafter, each element that constitutes the above formula described above and the content ratio (molar ratio) thereof will be described.

Nd

Nd is a main element constituting the crystal structure described above together with Fe and B. A part of Nd is substituted with one or more elements selected from the group consisting of La and $R^1$. Further, as described above, Nd can be treated as the equivalent element to Pr. Hereinafter, Pr, La, Ce, and $R^1$ will be described.

Pr

As described above, since Pr has similar physical property as Nd and the ionic radius of Pr and the ionic radius of Nd are close to each other, Pr can be treated as the equivalent element to Nd. Therefore, didymium (Di) may be applied to the magnetic material according to the present disclosure.

La

The substitution of a part of Nd and/or Pr with La contributes to the improvement of the saturation magnetization at the high temperature. Further, even in a case where all of Nd and/or Pr are substituted with La, by substituting a part of Fe with Co and/or Ni, the saturation magnetization at the high temperature that is not inferior to the $Nd_2Fe_{14}B$ phase is obtained.

$R^1$ $R^1$ is one or more rare earth elements other than Nd, Pr, and La. $R^1$ is one or more elements that are allowed to be contained within a range in which the magnetic characteristic of the magnetic material according to the present disclosure is not impaired. $R^1$ is typically one or more rare earth elements other than Nd, Pr, and La that are difficult to completely separate from each of Nd, Pr, and La and remain in a small amount in a raw material in a case where the raw material containing each of Nd, Pr, and La is purified.

Fe

Fe is a main element constituting the crystal structure described above together with Nd and B. Apart of Fe may be substituted with one or more elements selected from the group consisting of Co, Ni, and M. Hereinafter, Co, Ni, and M will be described.

Co

Co is substituted with a part of Fe to contribute to the stabilization of the main phase. The reason of the above is that the ionic radius of Co is smaller than the ionic radius of Fe, so that the crystal structure expanded by substituting a part or all of Nd and/or Pr with La can be decreased by Co.

Substituting a part of Fe with Co is convenient in that the Curie temperature of the main phase rises, and the decrease in the saturation magnetization at the high temperature (403 K to 473 K) can be suppressed.

Ni

As described above, since Ni is the iron group element and the ionic radius of Ni and the ionic radius of Co are close to each other, Ni can be treated as the equivalent element to Co. That is, Ni is substituted with a part of Fe to contribute to the stabilization of the main phase.

As described above, Ni can be treated as the equivalent element to Co from the viewpoint of the stabilization of the main phase. However, as compared with Fe and Co, Ni contributes less to the expression of the magnetization. In addition, Ni contributes less to the rise in the Curie temperature similarly to Co. Therefore, when it is desired to increase the magnetic characteristic, particularly the saturation magnetization as much as possible or when it is desired to raise the Curie temperature, it is preferable to decrease the content ratio (molar ratio) of Ni.

M

M is one or more elements other than Fe, Co, Ni, and the rare earth element, and the unavoidable impurity element. M is one or more elements and the unavoidable impurity element that are allowed to be contained within the range in which the magnetic characteristic of the magnetic material according to the present disclosure is not impaired. The unavoidable impurity element refers to an impurity element in which avoiding inclusion is unavoidable in a case where the magnetic material according to the present disclosure is manufactured, or causes a significant increase in the manufacturing cost to avoid its inclusion.

Examples of M excluding the unavoidable impurity element include one or more elements selected from the group consisting of titanium (Ti), chromium (Cr), manganese (Mn), vanadium (V), molybdenum (Mo), tungsten (W), and carbon (C). These elements, for example, form a nuclear material during the generation of the main phase and contribute to promotion of miniaturization of the main phase and/or the suppression of grain growth of the main phase.

Examples of M excluding the unavoidable impurity element include one or more elements selected from the group consisting of gallium (Ga), copper (Cu), and aluminum (Al). These elements decrease a melting point of an R-rich phase to be described below. As a result, liquid phase sintering can be applied to a case where the powder is sintered, and in a case where a sintered body is subjected to hot working, the R-rich phase can be easily melted to promote the anisotropic growth of the main phase.

The magnetic material according to the present disclosure can obtain desired saturation magnetization at the high temperature by containing the elements described so far in the following molar ratios. Regarding the above, the molar ratio formula $((Nd, Pr)_{(1-x-y)}La_xR^1{}_y))_2((Fe_{(1-z-w)}(Co, Ni)_zM_w))_{14}B$ that represents the composition of the main phase will be described by using x, y, z, and w.

x

In the above formula that represents the composition of the main phase, a value of x indicates a ratio (molar ratio) in which a part of Nd and/or Pr is substituted with La. x satisfies the values as follows.

When the value of x is 0.25 or more, the desired saturation magnetization can be obtained at the high temperature. From this viewpoint, the value of x may be 0.30 or more, 0.35 or more, 0.40 or more, 0.45 or more, or 0.50 or more. On the other hand, even in a case where the value of x is 1, when a part of Fe is substituted with Co and/or Ni and a rate of substitution thereof is set within the range to be described below, the main phase can be stabilized. From the viewpoint of the stabilization of the main phase, the value of x may be 0.95 or less, 0.90 or less, 0.85 or less, 0.80 or less, 0.75 or less, 0.70 or less, 0.65 or less, 0.61 or less, 0.60 or less, 0.55 or less, or 0.52 or less.

y

In the above formula that represents the composition of the main phase, y indicates a ratio (molar ratio) in which a part of Nd and/or Pr is substituted with $R^1$. y satisfies the values as follows.

As described above, $R^1$ is one or more rare earth elements that are allowed to be contained within the range in which the magnetic characteristic of the magnetic material according to the present disclosure is not impaired. From the above, y may be 0.10 or less, 0.08 or less, 0.06 or less, 0.04 or less, or 0.02 or less. On the other hand, the magnetic material according to the present disclosure may not contain $R^1$ at all, that is, y may be 0, but it is difficult to prevent $R^1$ from being contained in the raw material at all when the magnetic material according to the present disclosure is manufactured. From this viewpoint, y may be 0.01 or more.

z

In the above formula that represents the composition of the main phase, a value of z indicates a ratio (molar ratio) in which a part of Fe is substituted with Co and/or Ni. z satisfies the values as follows.

As described above, the crystal structure expanded by substituting a part or all of Nd and/or Pr with La can be decreased by substituting a part of Fe with Co and/or Ni.

When the value of z is 0.15 or more, the expanded crystal structure can be decreased, and thus the main phase can maintain the $R_2T_{14}B$ type crystal structure. From this viewpoint, the value of z may be 0.18 or more, 0.20 or more, or 0.22 or more.

On the other hand, as compared with Fe, Co and/or Ni contributes less to the magnetic characteristic, particularly the saturation magnetization at room temperature. When the value of z is 0.40 or less, the saturation magnetization at the high temperature can be improved without impairing the saturation magnetization at a room temperature in practice use. From this viewpoint, the value of z may be 0.38 or less, 0.36 or less, 0.34 or less, 0.32 or less, 0.31 or less, 0.30 or less, 0.28 or less, 0.26 or less, 0.24 or less, 0.22 or less, 0.21 or less, or 0.20 or less.

w

In the above formula that represents the composition of the main phase, w indicates a ratio (molar ratio) in which a part of Fe is substituted with M. As described above, M is one or more elements and the unavoidable impurity element that are allowed to be contained within the range in which the magnetic characteristic of the magnetic material according to the present disclosure is not impaired. From the above, w may be 0.10 or less, 0.08 or less, 0.06 or less, 0.04 or less, or 0.02 or less. On the other hand, the magnetic material according to the present disclosure may not contain M at all, that is, w may be 0, but it is difficult to prevent the unavoidable impurity element in M from being contained at all. From this viewpoint, w may be 0.01 or more.

As described above, Nd and Pr can be treated as the equivalent elements, and Co and Ni can be treated as the equivalent elements. From the above, in the molar ratio formula $((Nd, Pr)_{(1-x-y)}La_xR^1{}_y))_2((Fe_{(1-z-w)}(Co, Ni)_zM_w))_{14}B$ that represents the composition of the main phase, although, by denoting "(Nd, Pr)" and "(Co, Ni)", the molar ratio of Nd and Pr and the molar ratio of Co and Ni are not specified, specifying may be made as follows.

Molar Ratio of Nd and Pr

The fact that molar ratio of Nd and Pr may satisfy the following relationship will be described by replacing the "(Nd, Pr)" portion in the molar ratio formula that represents the composition of the main phase with the molar ratio formula "$(Nd_{(1-p)}Pr_p)$".

Nd and Pr have similar physical properties as described above. From this viewpoint, p may be 0 or more, 0.01 or more, 0.03 or more, 0.05 or more, 0.07 or more, 0.10 or more, 0.20 or more, 0.30 or more, 0.40 or more, or 0.50 or more, and may be 1 or less, 0.99 or less, 0.97 or less, 0.95 or less, 0.90 or less, 0.80 or less, 0.70 or less, or 0.60 or less.

The fact that p is 0 means that all of Nd and Pr are Nd. However, since it is often difficult to completely separate Nd and Pr in the raw material of the magnetic materials according to the present disclosure, p is substantially 0.01 or more. Further, the fact that p is 1 means that all of Nd and Pr are Pr. However, due to the problems related to the raw material and the like as described above, p is substantially 0.99 or less.

As compared with a $Pr_2Fe_{14}B$ phase, the $Nd_2Fe_{14}B$ phase is superior in the magnetic characteristic to some extent. From the above, in a case where the magnetic characteristic of the entire magnetic material is particularly improved, p may be 0 or more, 0.01 or more, 0.03 or more, 0.05 or more, 0.07 or more, 0.1 or more, or 0.2 or more, and may be 0.5 or less, 0.4 or less, or 0.3 or less.

Molar Ratio of Co and Ni

The fact that the molar ratio of Co and Ni may satisfy the following relationship will be described by replacing the "(Co, Ni)" portion in the molar ratio formula that represents the composition of the main phase with the molar ratio formula "$(Co_{(1-q)}Ni_q)$".

Co and Ni have similar physical properties as described above. From this viewpoint, q may be 0 or more, 0.01 or more, 0.03 or more, 0.05 or more, 0.07 or more, 0.10 or more, 0.20 or more, 0.30 or more, 0.40 or more, or 0.50 or more, and may be 1 or less, 0.99 or less, 0.97 or less, 0.95 or less, 0.90 or less, 0.80 or less, 0.70 or less, or 0.60 or less.

The fact that q is 0 means that all of Co and Ni are Co. However, since it is often difficult to completely separate Co and Ni in the raw material of the magnetic materials according to the present disclosure, q is substantially 0.01 or more. Further, the fact that q is 1 means that all of Co and Ni are Ni. However, due to the problems related to the raw material and the like as described above, q is substantially 0.99 or less.

Co raises the Curie temperature, but Ni contributes less to the Curie temperature. Also, as compared with Ni, Co contributes more to the saturation magnetization to some extent. From the above, in a case where the Curie temperature rises or the saturation magnetization of the entire magnetic material is particularly improved, q may be 0 or more, 0.01 or more, 0.03 or more, 0.05 or more, 0.07 or more, 0.1 or more, or 0.2 or more, and may be 0.5 or less, 0.4 or less, or 0.3 or less.

Volume Fraction of Main Phase

The magnetic material according to the present disclosure has the main phase having the $R_2T_{14}B$ type crystal structure, and the main phase has the composition described above. It is needed that in the main phase of the magnetic material according to the present disclosure, a part or all of Nd and/or Pr is substituted with La, and a part of Fe is substituted with Co and/or Ni. Therefore, a formation process of the main phase having the $R_2T_{14}B$ type crystal structure is based on a formation process of the $Nd_2Fe_{14}B$ phase. From the above, the magnetic material according to the present disclosure may have a so-called R-rich phase in addition to the main phase. By providing the R-rich phase, the formation of an α-Fe phase can be minimized when the main phase of the magnetic material according to the present disclosure is formed.

The α-Fe phase is a soft magnetic phase, and in a case where the α-Fe phase is present in the magnetic material, the apparent saturation magnetization is improved, but the coercive force is decreased. Therefore, in the magnetic material according to the present disclosure, it is preferable that a presence ratio (volume fraction) of the α-Fe phase be minimized. Note that the R-rich phase is a phase in which the molar ratio of the rare earth element is higher than the molar ratio of the main phase, and is typically a non-magnetic phase. The R-rich phase magnetically divides the main phases from each other and contributes to securing of the coercive force. Examples of the R-rich phase include a phase in which a part or all of Nd of an Nd-rich phase of the Nd—Fe—B-based magnetic material having the $Nd_2Fe_{14}B$ phase is substituted with one or more elements selected from the group consisting of Pr, La, and $R^1$ and a part of Fe is substituted with one or more elements selected from the group consisting of Co, Ni, and M.

The R-rich phase is a phase in which phases having various compositions having a higher R concentration than the main phase are mixed, so that it is difficult to express the R-rich phase by a composition formula (molar ratio formula). Therefore, it is generally called the "R-rich phase".

The magnetic material according to the present disclosure includes the main phase having the composition described above, but may have a small amount of the R-rich phase or a very small amount of the α-Fe phase. Also, the α-Fe phase includes a phase in which a part of Fe is substituted with one or more elements selected from the group consisting of Co, Ni, and M.

When the volume fraction of the main phase of the magnetic material according to the present disclosure is 80.0% or more, the decrease in the saturation magnetization due to the R-rich phase can be suppressed within a range in which there is no practical problem, and the decrease in the coercive force due to the α-Fe phase can be suppressed within a range in which there is no practical problem. From this viewpoint, the volume fraction of the main phase may be 82.0% or more, 84.0% or more, 86.0% or more, 88.0% or more, 90.0% or more, 92.0% or more, 94.0% or more, or 95.0% or more. On the other hand, the volume fraction of the main phase may be 100%, but it is preferable that the formation of the α-Fe phase be suppressed by the formation of the R-rich phase and the coercive force be secured by magnetically dividing the main phases by providing the R-rich phase around the main phase. From this viewpoint, the volume fraction of the main phase may be 99.5% or less, 99.0% or less, 98.5% or less, 98.0% or less, 97.5% or less, 97.0% or less, 96.5% or less, 96.0% or less, 95.9% or less, or 95.5% or less.

The volume fraction of the main phase is obtained by measuring the entire composition of the magnetic material by using inductively coupled plasma atomic emission spectroscopy (ICP-AES) to calculate the volume fraction of the main phase from the measured value on the assumption that the magnetic material is divided into an $(Nd, Pr, La, R^1)_2(Fe, Co, Ni, M)_{14}B$ phase and the R-rich phase. Note that the $(Nd, Pr, La, R^1)_2(Fe, Co, Ni, M)_{14}B$ phase means a $(Nd, Pr)_2Fe_{14}B$ phase, a phase in which a part or all of Nd and/or Pr of the $(Nd, Pr)_2Fe_{14}B$ phase is substituted with one or more elements selected from the group consisting of La and $R^1$, a phase in which a part of Fe of the $(Nd, Pr)_2Fe_{14}B$ phase is substituted with one or more elements selected from the group consisting of Co, Ni, and M, a phase in which a part or all of Nd and/or Pr of the $(Nd, Pr)_2Fe_{14}B$ phase is substituted with one or more elements selected from the group consisting of La and $R^1$ and a part of Fe of the $(Nd, Pr)_2Fe_{14}B$ phase is substituted with one or more elements selected from the group consisting of Co, Ni, and M.

Lattice Volume of Main Phase

It is considered that in a case where the lattice volume of the main phase is close to the lattice volume of the $Nd_2Fe_{14}B$ phase, the phase having the $R_2T_{14}B$ type crystal structure can be stably maintained. Although not restricted by theory, the reason of the above is that the lattice volume is considered to reflect a three-dimensional similarity of the crystal structure. The lattice volume of the $Nd_2Fe_{14}B$ phase is 0.949 $nm^3$. From the above, the lattice volume of the main phase may be 0.930 $nm^3$ or more, 0.935 $nm^3$ or more, 0.940 $nm^3$ or more, or 0.945 $nm^3$ or more, and may be 0.955 $nm^3$ or less, or 0.950 $nm^3$ or less. In a case where the lattice volume of the main phase is in the range described above, the main phase can stably maintain the $R_2T_{14}B$ type crystal structure.

The lattice volume of the main phase can be obtained by the following points. The X-ray diffraction analysis is performed with respect to the R—Fe—B-based magnetic material, and an a-axis length and a c-axis length are obtained from an X-ray diffraction pattern based on a relationship between a plane index and a lattice plane spacing value (d value). When the a-axis length and the c-axis length are obtained, since the main phase in the R—Fe—B-based magnetic material according to the present disclosure has the crystal structure described above, the main phase may be assumed to be a tetragonal crystal. Therefore, as the plane index, a (311) plane, a (214) plane, a (313) plane, a (224) plane, a (410) plane, and a(411) plane can be used. Then, the lattice volume is calculated according to the following expression.

$$(\text{lattice volume})=(a\text{-axis length})^2\times(c\text{-axis length})$$

Density of Main Phase

A density of the main phase is usually inversely proportional to the crystal lattice volume of the crystal. From the above, it is preferable that the density of the main phase be close to a density of the $Nd_2Fe_{14}B$ phase. The density of $Nd_2Fe_{14}B$ phase is 7.23 $g/cm^3$. From the above, the density of $Nd_2Fe_{14}B$ phase may be 7.00 $g/cm^3$ or more, 7.03 $g/cm^3$ or more, 7.05 $g/cm^3$ or more, 7.07 $g/cm^3$ or more, 7.10 $g/cm^3$ or more, or 7.20 $g/cm^3$ or more, and may be 7.90 $g/cm^3$ or less, 7.80 $g/cm^3$ or less, 7.70 $g/cm^3$ or less, 7.60 $g/cm^3$ or less, 7.50 $g/cm^3$ or less, 7.40 $g/cm^3$ or less, 7.35 $g/cm^3$ or less, or 7.30 $g/cm^3$ or less.

The density of the main phase is obtained by, for example, pulverizing the magnetic material to obtain powder and measuring the density of the powder by a pycnometer method.

Manufacturing Method

Next, a manufacturing method of the magnetic material according to the present disclosure (hereinafter, may be referred to as the "manufacturing method according to the present disclosure") will be described.

The manufacturing method according to the present disclosure includes a melting and solidifying step and, optionally, a homogenization heat treatment step. Hereinafter, each of the steps will be described.

Melting and Solidifying Step

In the manufacturing method according to the present disclosure, the raw material containing the elements described above that constitute the main phase is melted and solidified to obtain an ingot. In a case where the ingot is obtained, it is preferable to form the R-rich phase to suppress the formation of an α-(Fe, Co, Ni, M) phase. By suppressing the formation of the α-(Fe, Co, Ni, M) phase, the coercive force of the magnetic material can be secured. Note that the α-(Fe, Co, Ni, M) phase means a phase in which a part of Fe in the α-Fe phase and the α-Fe phase is substituted with one or more elements selected from the group consisting of Co, Ni, and M.

Due to the R-rich phase, the saturation magnetization of the entire magnetic material is decreased. However, by forming the R-rich phase, the formation of the α-(Fe, Co, Ni, M) phase described above is suppressed, and the main phases are magnetically divided by the R-rich phase, so that the coercive force of the entire magnetic material can be secured. Therefore, by setting the volume fraction of the main phase to the range described above, the saturation magnetization of the entire magnetic material can be set to a range in which there is no practical problem.

In order to set the volume fraction of the main phase within the range described above, it is preferable that the total molar ratio of the rare earth elements in the formulation of the raw material be equal to or more than the total molar ratio of the rare earth elements in the main phase. From the above, the formulation of the raw material is preferably $((Nd, Pr)_{(1-x-y)}La_xR^1{}_y))_t((Fe_{(1-z-w)}(Co, Ni)_zM_w))_{14}B$ (where, t is 2.00 to 3.00). In this case, x, y, z, and w may be the same as x, y, z, and w in the formula described above that represents the composition of the main phase. From the viewpoint of suppressing the expression of the α-(Fe, Co, Ni, M) phase, t is preferably 2.01 or more, 2.02 or more, 2.03 or more, 2.04 or more, 2.05 or more, 2.06 or more, 2.08 or more, 2.10 or more, 2.20 or more, 2.30 or more, 2.40 or more, or 2.50 or more. On the other hand, from the viewpoint of minimization of the volume fraction of the R-rich phase, t is more preferably 2.90 or less, 2.80 or less, 2.70 or less, or 2.60 or less. Note that when there is no depletion of specific elements during a manufacturing step, the entire composition of the magnetic material (the sum of the main phase and the phases other than the main phase) is substantially the same as the formulation of the raw material.

A Well-known method can be applied to the melting and solidifying of the raw material. Examples of the method of melting the raw material include a method in which the raw material is charged into a container, such as a crucible, the raw material is arc-melted or high-frequency melted in the container to obtain a molten metal. Examples of the method of solidifying the molten metal include injection of the molten metal into the mold, such as a book mold, or solidification of the molten metal in the crucible. From the viewpoints of suppressing coarsening of the main phase and enhancing homogenization of the main phase, it is preferable to increase a cooling rate of the molten metal. Therefore, it is preferable to inject the molten metal into the mold, such as the book mold. Also, from the viewpoint of suppressing the coarsening of the main phase and further enhancing the homogenization of the main phase, for example, the following method may be applied. That is, an ingot obtained by high-frequency melting or arc-melting the raw material in the container and solidifying the melted material may be melted again by high-frequency melting or the like, the melt may be quenched by using a strip casting method, a liquid quenching method, and the like to obtain a flake.

Homogenization Heat Treatment Step

In order to homogenize the main phase in the ingot, the ingot may be subjected to the heat treatment (hereinafter, such heat treatment may be referred to as "homogenization heat treatment"). The flake obtained by quenching by using the strip casting method, the liquid quenching method, or the like may be subjected to the homogenization heat treatment.

A temperature of the homogenization heat treatment may be, for example, 1273 K or higher, 1323 K or higher, or 1373 K or higher, and may be 1573 K or lower, 1523 K or lower, 1473 K or lower, or 1423 K or lower. The homogenization heat treatment time may be, for example, 6 hours or longer, 12 hours or longer, 18 hours or longer, or 24 hours or longer, and may be 48 hours or shorter, 42 hours or shorter, 36 hours or shorter, or 30 hours or shorter.

It is preferable that the homogenization heat treatment be performed in inert gas atmosphere in order to suppress oxidation of the ingot. The nitrogen gas atmosphere is included in the inert gas atmosphere.

Pulverization Step

The ingot may be pulverized before or after the homogenization heat treatment. Typically, the ingot is pulverized after the homogenization heat treatment.

A well-known method can be applied to the pulverization of the ingot. Examples of a pulverization method include methods by using a cutter mill, a ball mill, and a jet mill. These methods may be combined.

It is preferable that the ingot be pulverized in the inert gas atmosphere. As a result, it is possible to suppress the oxidation of the ingot and powder after pulverization. The nitrogen gas atmosphere is included in the inert gas atmosphere. A particle size of the powder after the pulverization may be, in terms of $D_{50}$, 5 μm or more, 10 μm or more, or 15 μm or more, and may be 50 μm or less, 40 μm or less, 30 μm or less, 25 μm or less, or 20 μm or less.

Modification

The magnetic material and the manufacturing method thereof according to the present disclosure are not limited to the embodiments described so far, and may be appropriately modified within the scope described in the claims. For example, the magnetic material according to the present disclosure may be powder or a molded body of the powder. The molded body may be the bond molded body or a sintered molded body. Examples of the bond molded body typically include a resin bond molded body. As a sintering method, for example, non-pressure sintering and pressure sintering can be appropriately selected depending on a particle size of the main phase and the like.

Hereinafter, the magnetic material and the manufacturing method thereof according to the present disclosure will be described in more detail with reference to Examples, Comparative Examples, and Related-art Examples. Note that the magnetic material and the manufacturing method thereof according to the present disclosure are not limited to the conditions and the like used in Examples below.

Preparation of Sample

A sample of the magnetic material was prepared by the following points.

Metal Nd, a Ce—Fe alloy, metal La, metal Pr, metal Fe, metal Co, metal Ni, an Fe—B alloy, metal Ga, and metal Cu were mixed such that the main phase had the composition shown in Table 2, and the mixture was high-frequency melted and solidified to obtain a magnetic material ingot. In the mixing of raw material powder, the total number of mixing moles of Nd, Ce, La, and Pr was larger than the total number of moles of Nd, Ce, La, and Pr in the main phase such that the volume fraction of the main phase was 95% to 100%. Note that in the present specification, for example, "metal Nd" means unalloyed Nd. It is needless to say that the metal Nd may contain the unavoidable impurity.

The ingot of the magnetic material was subjected to the homogenization heat treatment in an argon gas atmosphere at 1398 K for 24 hours.

The magnetic material ingot after the homogenization heat treatment was charged into a glove box, and the magnetic material ingot was pulverized by using the cutter mill in the argon gas atmosphere. The particle size of the magnetic material powder after the pulverization was 20 m or less in terms of $D_{50}$.

Evaluation

For each sample, the composition, the volume fraction, the density, and the lattice volume of the main phase were obtained by the measurement method described above. Further, for each sample, the magnetic characteristic was measured by applying a maximum magnetic field of 9 T by using a physical property measurement system PPMS (registered trademark)—VSM. As for the measurement of the magnetic characteristic, each sample powder was solidified while being magnetically oriented in an epoxy resin, and the magnetic characteristic of each sample after the solidification was measured at 300 K to 453 K in an easy-magnetization axis direction and a hard-magnetization axis direction. Saturation magnetization Ms was calculated from the measured values in the easy-magnetization axis direction by using law of approach to saturation. Further, an anisotropic magnetic field Ha was obtained from the measured values in the hard-magnetization axis direction by using a singular point detection (SPD) method.

Figure 2:
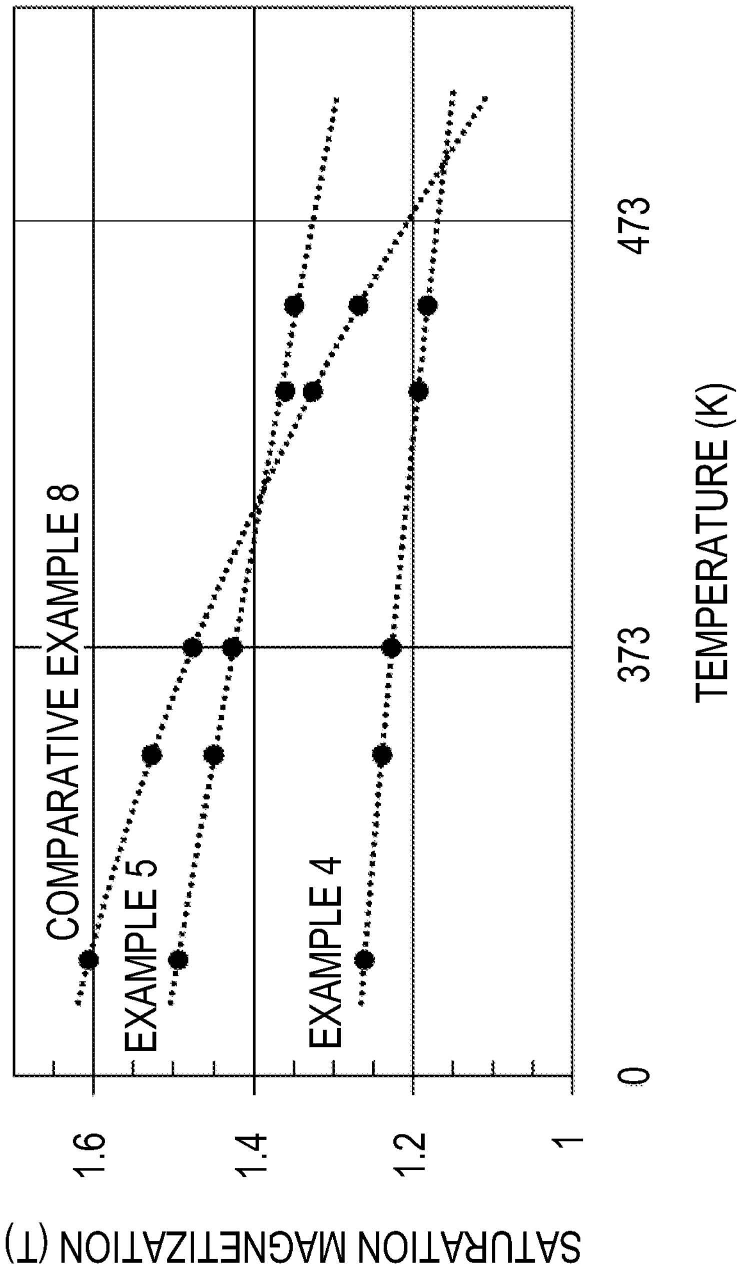
FIG. 2 is a graph showing a relationship between a temperature and the saturation magnetization Ms for Example 4, Example 5, and Comparative Example 2.

Table 2 shows the results. In Table 2, "$R_2T_{14}B$ phase" means a "phase having a $R_2T_{14}B$ type crystal structure". Table 2 also shows a rate of change in saturation magnetization (%/K) per unit temperature as a reference value. The rate of change in saturation magnetization per unit temperature is a value obtained by evaluating, per 1 K, the rate of change in saturation magnetization when the temperature of the magnetic material rises from the room temperature (300 K) to 453 K, and can be calculated by Expression (1) below.

$$[\{(Ms_{(453\ K)}-Ms_{(300\ K)})/Ms_{(300\ K)}\}/(453\ \text{K}-300\ \text{K})]\times 100 \quad \text{Expression (1)}$$

where, $Ms_{(300\ K)}$: saturation magnetization at 300 K $Ms_{(453\ K)}$: saturation magnetization at 453 K FIG. 1 is a graph showing a relationship between a reduction rate of the usage amount of Nd and Pr and the saturation magnetization Ms at the high temperature (453 K). FIG. 2 is a graph showing a relationship between a temperature and the saturation magnetization Ms for Example 4, Example 5, and Comparative Example 2. Note that the reduction rate of the usage amount of Nd and Pr corresponds to 1−x−y in the formula described above that represents the composition of the main phase.

TABLE 2

| | Composition of main phase (target) | Molar ratio of rare earth site | | | | | |
|---|---|---|---|---|---|---|---|
| | | Nd | Pr | Ce | La | $R^1$ | Nd + Pr |
| Comparative Example 1 | $(Nd_{0.81}La_{0.19}Fe_{14}B$ | 0.809 | 0.000 | 0.000 | 0.191 | 0.000 | 0.809 |
| Comparative Example 2 | $(Nd_{0.32}La_{0.68})_2Fe_{14}B$ | 0.316 | 0.000 | 0.000 | 0.684 | 0.000 | 0.316 |
| Comparative Example 3 | $(Nd_{0.61}La_{0.39})_2Fe_{14}B$ | 0.612 | 0.000 | 0.000 | 0.388 | 0.000 | 0.612 |
| Comparative Example 4 | $(Nd_{0.5}La_{0.5})_2Fe_{14}B$ | 0.500 | 0.000 | 0.000 | 0.500 | 0.000 | 0.500 |
| Comparative Example 5 | $(Nd_{043}La_{0.57})_2Fe_{14}B$ | 0.434 | 0.000 | 0.000 | 0.566 | 0.000 | 0.434 |
| Comparative Example 6 | $(Nd_{0.7}La_{0.3})_2Fe_{14}B$ | 0.704 | 0.000 | 0.000 | 0.296 | 0.000 | 0.704 |
| Comparative Example 7 | $(La_{0.48}Pr_{0.52})_2Fe_{14}B$ | 0.000 | 0.516 | 0.000 | 0.484 | 0.000 | 0.516 |
| Comparative Example 8 | $Nd_2Fe_{14}B$ | 1.000 | 0.000 | 0.000 | 0.000 | 0.000 | 1.000 |
| Comparative Example 9 | $(Nd_{0.51}La_{0.24}Pr_{0.25})_2Fe_{14}B$ | 0.512 | 0.246 | 0.000 | 0.243 | 0.000 | 0.757 |
| Comparative Example 10 | $La_2(Fe_{0.5}Co_{0.5})_{14}B$ | 0.000 | 0.000 | 0.000 | 1.000 | 0.000 | 0.000 |
| Comparative Example 11 | $La_2(Fe_{0.8}Co_{0.2})_{14}B$ | 0.000 | 0.000 | 0.000 | 1.000 | 0.000 | 0.000 |
| Comparative Example 12 | $La_2(Fe_{0.9}Co_{0.1})_{14}B$ | 0.000 | 0.000 | 0.000 | 1.000 | 0.000 | 0.000 |
| Comparative Example 13 | $La_2Fe_{14}B$ | 0.000 | 0.000 | 0.000 | 1.000 | 0.000 | 0.000 |
| Example 1 | $(Nd_{0.5}La_{0.5})_2(Fe_{0.8}Co_{0.20})_{14}B$ | 0.500 | 0.000 | 0.000 | 0.500 | 0.000 | 0.500 |
| Example 2 | $(Nd_{0.5}La_{0.5})_2(Fe_{0.85}Co_{0.15})_{14}B$ | 0.500 | 0.000 | 0.000 | 0.500 | 0.000 | 0.500 |
| Example 3 | $(Nd_{0.39}La_{0.61})_2(Fe_{0.61}Co_{0.39})_{14}B$ | 0.391 | 0.000 | 0.000 | 0.609 | 0.000 | 0.391 |
| Example 4 | $La_2(Fe_{0.69}Co_{0.31})_{14}B$ | 0.000 | 0.000 | 0.000 | 1.000 | 0.000 | 0.000 |
| Example 5 | $(Nd_{0.48}La_{0.52})_2(Fe_{0.8}Co_{0.2})_{14}B$ | 0.484 | 0.000 | 0.000 | 0.516 | 0.000 | 0.484 |
| Example 6 | $(Nd_{0.49}La_{0.51})_2(Fe_{0.6}Co_{0.4})_{14}B$ | 0.492 | 0.000 | 0.000 | 0.508 | 0.000 | 0.492 |
| Example 7 | $(Nd_{0.75}La_{0.25})_2(Fe_{0.8}Co_{0.20})_{14}B$ | 0.750 | 0.000 | 0.000 | 0.250 | 0.000 | 0.750 |
| Example 8 | $(Nd_{0.75}La_{0.25})_2(Fe_{0.85}Co_{0.15})_{14}B$ | 0.750 | 0.000 | 0.000 | 0.250 | 0.000 | 0.750 |

| | Molar ratio of iron group site | | | | | | |
|---|---|---|---|---|---|---|---|
| | | | | | M | | |
| | Fe | Co | Ni | Co + Ni | Ga | Cu | Other than Ga and Cu |
| Comparative Example 1 | 1.000 | 0.000 | 0.000 | 0.000 | 0.000 | 0.000 | 0.000 |
| Comparative Example 2 | 1.000 | 0.000 | 0.000 | 0.000 | 0.000 | 0.000 | 0.000 |
| Comparative Example 3 | 1.000 | 0.000 | 0.000 | 0.000 | 0.000 | 0.000 | 0.000 |
| Comparative Example 4 | 1.000 | 0.000 | 0.000 | 0.000 | 0.000 | 0.000 | 0.000 |
| Comparative Example 5 | 1.000 | 0.000 | 0.000 | 0.000 | 0.000 | 0.000 | 0.000 |
| Comparative Example 6 | 1.000 | 0.000 | 0.000 | 0.000 | 0.000 | 0.000 | 0.000 |
| Comparative Example 7 | 1.000 | 0.000 | 0.000 | 0.000 | 0.000 | 0.000 | 0.000 |
| Comparative Example 8 | 1.000 | 0.000 | 0.000 | 0.000 | 0.000 | 0.000 | 0.000 |
| Comparative Example 9 | 1.000 | 0.000 | 0.000 | 0.000 | 0.000 | 0.000 | 0.000 |
| Comparative Example 10 | 0.501 | 0.499 | 0.000 | 0.499 | 0.000 | 0.000 | 0.000 |

TABLE 2-continued

| | | | | | | | |
|---|---|---|---|---|---|---|---|
| Comparative Example 11 | 0.800 | 0.200 | 0.000 | 0.200 | 0.000 | 0.000 | 0.000 |
| Comparative Example 12 | 0.900 | 0.100 | 0.000 | 0.100 | 0.000 | 0.000 | 0.000 |
| Comparative Example 13 | 1.000 | 0.000 | 0.000 | 0.000 | 0.000 | 0.000 | 0.000 |
| Example 1 | 0.799 | 0.201 | 0.000 | 0.201 | 0.000 | 0.000 | 0.000 |
| Example 2 | 0.848 | 0.152 | 0.000 | 0.152 | 0.000 | 0.000 | 0.000 |
| Example 3 | 0.605 | 0.395 | 0.000 | 0.395 | 0.000 | 0.000 | 0.000 |
| Example 4 | 0.695 | 0.305 | 0.000 | 0.305 | 0.000 | 0.000 | 0.000 |
| Example 5 | 0.796 | 0.204 | 0.000 | 0.204 | 0.000 | 0.000 | 0.000 |
| Example 6 | 0.602 | 0.398 | 0.000 | 0.398 | 0.000 | 0.000 | 0.000 |
| Example 7 | 0.793 | 0.200 | 0.000 | 0.200 | 0.005 | 0.002 | 0.007 |
| Example 8 | 0.843 | 0.150 | 0.000 | 0.150 | 0.005 | 0.002 | 0.007 |

| | | Molar ratio of rare earth site | | | | | |
|---|---|---|---|---|---|---|---|
| | Composition of main phase (target) | Nd | Pr | Ce | La | $R^1$ | Nd + Pr |
| Related-art Example 1 | $(Nd_{0.42}Ce_{0.2}La_{0.38})_2Fe_{14}B$ | 0.418 | 0.000 | 0.197 | 0.385 | 0.197 | 0.418 |
| Related-art Example 2 | $(Nd_{0.34}Ce_{0.33}La_{0.33})_2(Fe_{0.7}Co_{0.3})_{14}B$ | 0.338 | 0.000 | 0.326 | 0.336 | 0.326 | 0.338 |
| Related-art Example 3 | $(Ce_{0.49}La_{0.51})_2(Fe_{0.69}Co_{0.31})_{14}B$ | 0.000 | 0.000 | 0.487 | 0.513 | 0.487 | 0.000 |
| Related-art Example 4 | $(Nd_{0.25}Ce_{0.25}La_{0.25}Pr_{0.25})_2Fe_{14}B$ | 0.250 | 0.250 | 0.250 | 0.250 | 0.250 | 0.500 |
| Related-art Example 5 | $(Nd_{0.07}Ce_{0.41}Pr_{0.52})_2(Fe_{0.59}Co_{0.41})_{14}B$ | 0.065 | 0.523 | 0.412 | 0.000 | 0.412 | 0.588 |
| Related-art Example 6 | $Ce_2(Fe_{0.86}Co_{0.14})_{14}B$ | 0.000 | 0.000 | 1.000 | 0.000 | 1.000 | 0.000 |
| Related-art Example 7 | $Ce_2(Fe_{0.74}Co_{0.26})_{14}B$ | 0.000 | 0.000 | 1.000 | 0.000 | 1.000 | 0.000 |
| Related-art Example 8 | $Ce_2(Fe_{0.7}Co_{0.3})_{14}B$ | 0.000 | 0.000 | 1.000 | 0.000 | 1.000 | 0.000 |
| Related-art Example 9 | $Ce_2Fe_{14}B$ | 0.000 | 0.000 | 1.000 | 0.000 | 1.000 | 0.000 |
| Related-art Example 10 | $(Nd_{0.52}Ce_{0.48})_2Fe_{14}B$ | 0.520 | 0.000 | 0.480 | 0.000 | 0.480 | 0.520 |
| Related-art Example 11 | $(Nd_{0.49}Ce_{0.51})_2(Fe_{0.79}Co_{0.21})B$ | 0.491 | 0.000 | 0.509 | 0.000 | 0.509 | 0.491 |
| Related-art Example 12 | $(Nd_{0.49}Ce_{0.51})_2(Fe_{0.58}Co_{0.42})_{13}B$ | 0.490 | 0.000 | 0.510 | 0.000 | 0.510 | 0.490 |
| Related-art Example 13 | $(Ce_{0.5}La_{0.5})_2Fe_{14}B$ | 0.000 | 0.000 | 0.496 | 0.504 | 0.496 | 0.000 |
| Related-art Example 14 | $(Nd_{0.2}Ce_{0.5}La_{0.25}Pr_{0.05})_2(Fe_{0.98}Co_{0.02})_{14}B$ | 0.200 | 0.050 | 0.500 | 0.250 | 0.500 | 0.250 |
| Related-art Example 15 | $Ce_2(Fe_{0.92}Co_{0.07}Ni_{0.01})_{14}B$ | 0.000 | 0.000 | 1.000 | 0.000 | 1.000 | 0.000 |
| Related-art Example 16 | $(Ce_{0.51}Pr_{0.49})_2Fe_{14}B$ | 0.000 | 0.491 | 0.509 | 0.000 | 0.509 | 0.491 |

| | Molar ratio of iron group site | | | | | | |
|---|---|---|---|---|---|---|---|
| | | | | | M | | |
| | Fe | Co | Ni | Co + Ni | Ga | Cu | Other than Ga and Cu |
| Related-art Example 1 | 1.000 | 0.000 | 0.000 | 0.000 | 0.000 | 0.000 | 0.000 |
| Related-art Example 2 | 0.686 | 0.314 | 0.000 | 0.314 | 0.000 | 0.000 | 0.000 |
| Related-art Example 3 | 0.694 | 0.306 | 0.000 | 0.306 | 0.000 | 0.000 | 0.000 |
| Related-art Example 4 | 1.000 | 0.000 | 0.000 | 0.000 | 0.000 | 0.000 | 0.000 |
| Related-art Example 5 | 0.590 | 0.410 | 0.000 | 0.410 | 0.000 | 0.000 | 0.000 |
| Related-art Example 6 | 0.862 | 0.138 | 0.000 | 0.138 | 0.000 | 0.000 | 0.000 |
| Related-art Example 7 | 0.738 | 0.262 | 0.000 | 0.262 | 0.000 | 0.000 | 0.000 |
| Related-art Example 8 | 0.700 | 0.300 | 0.000 | 0.300 | 0.000 | 0.000 | 0.000 |
| Related-art Example 9 | 1.000 | 0.000 | 0.000 | 0.000 | 0.000 | 0.000 | 0.000 |
| Related-art Example 10 | 1.000 | 0.000 | 0.000 | 0.000 | 0.000 | 0.000 | 0.000 |

TABLE 2-continued

| | | | | | | | |
|---|---|---|---|---|---|---|---|
| Related-art Example 11 | 0.788 | 0.212 | 0.000 | 0.212 | 0.000 | 0.000 | 0.000 |
| Related-art Example 12 | 0.584 | 0.416 | 0.000 | 0.416 | 0.000 | 0.000 | 0.000 |
| Related-art Example 13 | 1.000 | 0.000 | 0.000 | 0.000 | 0.000 | 0.000 | 0.000 |
| Related-art Example 14 | 0.980 | 0.020 | 0.000 | 0.020 | 0.000 | 0.000 | 0.000 |
| Related-art Example 15 | 0.917 | 0.075 | 0.007 | 0.082 | 0.000 | 0.000 | 0.000 |
| Related-art Example 16 | 1.000 | 0.000 | 0.000 | 0.000 | 0.000 | 0.000 | 0.000 |

| | Content of each element in main phase (% by atom) | | | | | | | | | |
|---|---|---|---|---|---|---|---|---|---|---|
| | Nd | Pr | Ce | La | Fe | Co | Ni | Ga | Cu | B |
| Comparative Example 1 | 9.520 | 0.000 | 0.000 | 2.245 | 82.353 | 0.000 | 0.000 | 0.000 | 0.000 | 5.882 |
| Comparative Example 2 | 3.719 | 0.000 | 0.000 | 8.045 | 82.353 | 0.000 | 0.000 | 0.000 | 0.000 | 5.882 |
| Comparative Example 3 | 7.201 | 0.000 | 0.000 | 4.563 | 82.353 | 0.000 | 0.000 | 0.000 | 0.000 | 5.882 |
| Comparative Example 4 | 5.882 | 0.000 | 0.000 | 5.882 | 82.353 | 0.000 | 0.000 | 0.000 | 0.000 | 5.882 |
| Comparative Example 5 | 5.102 | 0.000 | 0.000 | 6.663 | 82.353 | 0.000 | 0.000 | 0.000 | 0.000 | 5.882 |
| Comparative Example 6 | 8.281 | 0.000 | 0.000 | 3.484 | 82.353 | 0.000 | 0.000 | 0.000 | 0.000 | 5.882 |
| Comparative Example 7 | 0.000 | 6.071 | 0.000 | 5.694 | 82.353 | 0.000 | 0.000 | 0.000 | 0.000 | 5.882 |
| Comparative Example 8 | 11.765 | 0.000 | 0.000 | 0.000 | 82.353 | 0.000 | 0.000 | 0.000 | 0.000 | 5.882 |
| Comparative Example 9 | 6.022 | 2.889 | 0.000 | 2.853 | 82.353 | 0.000 | 0.000 | 0.000 | 0.000 | 5.882 |
| Comparative Example 10 | 0.000 | 0.000 | 0.000 | 11.765 | 41.234 | 41.119 | 0.000 | 0.000 | 0.000 | 5.882 |
| Comparative Example 11 | 0.000 | 0.000 | 0.000 | 11.765 | 65.882 | 16.471 | 0.000 | 0.000 | 0.000 | 5.882 |
| Comparative Example 12 | 0.000 | 0.000 | 0.000 | 11.765 | 74.118 | 8.235 | 0.000 | 0.000 | 0.000 | 5.882 |
| Comparative Example 13 | 0.000 | 0.000 | 0.000 | 11.765 | 82.353 | 0.000 | 0.000 | 0.000 | 0.000 | 5.882 |
| Example 1 | 5.882 | 0.000 | 0.000 | 5.882 | 65.834 | 16.519 | 0.000 | 0.000 | 0.000 | 5.882 |
| Example 2 | 5.882 | 0.000 | 0.000 | 5.882 | 69.858 | 12.495 | 0.000 | 0.000 | 0.000 | 5.882 |
| Example 3 | 4.595 | 0.000 | 0.000 | 7.170 | 49.828 | 32.525 | 0.000 | 0.000 | 0.000 | 5.882 |
| Example 4 | 0.000 | 0.000 | 0.000 | 11.765 | 57.195 | 25.158 | 0.000 | 0.000 | 0.000 | 5.882 |
| Example 5 | 5.695 | 0.000 | 0.000 | 6.070 | 65.562 | 16.791 | 0.000 | 0.000 | 0.000 | 5.882 |
| Example 6 | 5.787 | 0.000 | 0.000 | 5.978 | 49.543 | 32.810 | 0.000 | 0.000 | 0.000 | 5.882 |
| Example 7 | 8.824 | 0.000 | 0.000 | 2.941 | 65.306 | 16.471 | 0.000 | 0.412 | 0.165 | 5.882 |
| Example 8 | 8.824 | 0.000 | 0.000 | 2.941 | 69.424 | 12.353 | 0.000 | 0.412 | 0.165 | 5.882 |

| | Content of each element in main phase (% by atom) | | | | | | | | | |
|---|---|---|---|---|---|---|---|---|---|---|
| | Nd | Pr | Ce | La | Fe | Co | Ni | Ga | Cu | B |
| Related-art Example 1 | 4.914 | 0.000 | 2.323 | 4.527 | 82.353 | 0.000 | 0.000 | 0.000 | 0.000 | 5.882 |
| Related-art Example 2 | 3.976 | 0.000 | 3.840 | 3.949 | 56.514 | 25.839 | 0.000 | 0.000 | 0.000 | 5.882 |
| Related-art Example 3 | 0.000 | 0.000 | 5.727 | 6.038 | 57.151 | 25.202 | 0.000 | 0.000 | 0.000 | 5.882 |
| Related-art Example 4 | 2.941 | 2.941 | 2.941 | 2.941 | 82.353 | 0.000 | 0.000 | 0.000 | 0.000 | 5.882 |
| Related-art Example 5 | 0.760 | 6.155 | 4.851 | 0.000 | 48.556 | 33.796 | 0.000 | 0.000 | 0.000 | 5.882 |
| Related-art Example 6 | 0.000 | 0.000 | 11.765 | 0.000 | 70.957 | 11.396 | 0.000 | 0.000 | 0.000 | 5.882 |
| Related-art Example 7 | 0.000 | 0.000 | 11.765 | 0.000 | 60.753 | 21.599 | 0.000 | 0.000 | 0.000 | 5.882 |
| Related-art Example 8 | 0.000 | 0.000 | 11.765 | 0.000 | 57.647 | 24.706 | 0.000 | 0.000 | 0.000 | 5.882 |
| Related-art Example 9 | 0.000 | 0.000 | 11.765 | 0.000 | 82.353 | 0.000 | 0.000 | 0.000 | 0.000 | 5.882 |
| Related-art Example 10 | 6.119 | 0.000 | 5.646 | 0.000 | 82.353 | 0.000 | 0.000 | 0.000 | 0.000 | 5.882 |
| Related-art Example 11 | 5.775 | 0.000 | 5.989 | 0.000 | 64.928 | 17.425 | 0.000 | 0.000 | 0.000 | 5.882 |
| Related-art Example 12 | 5.766 | 0.000 | 5.999 | 0.000 | 48.105 | 34.248 | 0.000 | 0.000 | 0.000 | 5.882 |

TABLE 2-continued

| | | | | | | | | | | |
|---|---|---|---|---|---|---|---|---|---|---|
| Related-art Example 13 | 0.000 | 0.000 | 5.836 | 5.929 | 82.353 | 0.000 | 0.000 | 0.000 | 0.000 | 5.882 |
| Related-art Example 14 | 2.353 | 0.588 | 5.882 | 2.941 | 80.706 | 1.647 | 0.000 | 0.000 | 0.000 | 5.882 |
| Related-art Example 15 | 0.000 | 0.000 | 11.765 | 0.000 | 75.543 | 6.161 | 0.602 | 0.000 | 0.000 | 5.882 |
| Related-art Example 16 | 0.000 | 5.776 | 5.989 | 0.000 | 82.353 | 0.000 | 0.000 | 0.000 | 0.000 | 5.882 |

| | Crystal structure of main phase | | | | | | |
|---|---|---|---|---|---|---|---|
| | $R_2T_{14}B$ phase | | | | | | |
| | Presence or absence of formation | Volume fraction (%) | a-Axis length (nm) | c-Axis length (nm) | Lattice volume ($nm^3$) | (c-Axis length)/(a-Axis length) | Density ($g/cm^3$) |
| Comparative Example 1 | Formed | 96.0 | 0.880 | 1.223 | 1.390 | 0.947 | 7.40 |
| Comparative Example 2 | Formed | 95.9 | 0.881 | 1.232 | 1.398 | 0.957 | 7.33 |
| Comparative Example 3 | Formed | 98.5 | 0.880 | 1.227 | 1.394 | 0.950 | 7.27 |
| Comparative Example 4 | Formed | 96.8 | 0.882 | 1.228 | 1.392 | 0.955 | 7.07 |
| Comparative Example 5 | Formed | 99.4 | 0.882 | 1.230 | 1.394 | 0.957 | 7.35 |
| Comparative Example 6 | Formed | 95.5 | 0.882 | 1.226 | 1.391 | 0.953 | 7.47 |
| Comparative Example 7 | Formed | 96.6 | 0.883 | 1.231 | 1.395 | 0.959 | 6.99 |
| Comparative Example 8 | Formed | 96.3 | 0.881 | 1.221 | 1.386 | 0.949 | 7.23 |
| Comparative Example 9 | Formed | 95.0 | 0.880 | 1.226 | 1.393 | 0.950 | 7.13 |
| Comparative Example 10 | Formed | 64.3 | 0.876 | 1.234 | 1.409 | 0.947 | 7.65 |
| Comparative Example 11 | Not formed | — | — | — | — | — | — |
| Comparative Example 12 | Not formed | — | — | — | — | — | — |
| Comparative Example 13 | Not formed | — | — | — | — | — | — |
| Example 1 | Formed | 94.2 | 0.879 | 1.223 | 1.391 | 0.945 | 7.61 |
| Example 2 | Formed | 93.9 | 0.880 | 1.224 | 1.391 | 0.947 | 7.57 |
| Example 3 | Formed | 95.9 | 0.877 | 1.221 | 1.392 | 0.939 | 7.73 |
| Example 4 | Formed | 88.0 | 0.879 | 1.229 | 1.398 | 0.950 | 7.40 |
| Example 5 | Formed | 90.4 | 0.880 | 1.223 | 1.390 | 0.946 | 7.52 |
| Example 6 | Formed | 91.8 | 0.876 | 1.218 | 1.390 | 0.934 | 7.69 |
| Example 7 | Formed | 94.3 | 0.878 | 1.219 | 1.388 | 0.941 | 7.52 |
| Example 8 | Formed | 94.8 | 0.879 | 1.220 | 1.388 | 0.943 | 7.86 |

| | Magnetic characteristic | | | |
|---|---|---|---|---|
| | 300K | | 453K | |
| | Saturation magnetization Ms (T) | Anisotropic magnetic field Ha (T) | Saturation magnetization Ms (T) | Anisotropic magnetic field Ha (T) |
| Comparative Example 1 | 1.36 | 6.97 | 1.11 | 4.13 |
| Comparative Example 2 | 1.17 | 3.90 | 0.97 | 3.10 |
| Comparative Example 3 | 1.25 | 5.49 | 1.01 | 3.38 |
| Comparative Example 4 | 1.41 | 5.16 | 1.22 | 2.41 |
| Comparative Example 5 | 1.32 | 5.32 | 1.03 | 3.54 |
| Comparative Example 6 | 1.40 | 7.23 | 1.15 | 4.10 |
| Comparative Example 7 | 1.42 | 5.33 | 1.16 | 2.51 |
| Comparative Example 8 | 1.59 | 7.97 | 1.27 | 3.61 |
| Comparative Example 9 | 1.45 | 6.91 | 1.23 | 2.78 |
| Comparative Example 10 | 1.06 | 2.16 | 1.00 | 1.33 |
| Comparative Example 11 | — | — | — | — |
| Comparative Example 12 | — | — | — | — |
| Comparative Example 13 | — | — | — | — |
| Example 1 | 1.47 | 5.81 | 1.33 | 2.63 |
| Example 2 | 1.48 | 5.69 | 1.31 | 2.56 |
| Example 3 | 1.34 | 4.80 | 1.34 | 3.06 |
| Example 4 | 1.26 | 2.58 | 1.18 | 2.11 |
| Example 5 | 1.49 | 4.65 | 1.35 | 2.97 |
| Example 6 | 1.39 | 4.58 | 1.30 | 2.76 |
| Example 7 | 1.45 | 6.64 | 1.32 | 2.83 |
| Example 8 | 1.54 | 6.61 | 1.36 | 2.98 |

| | Crystal structure of main phase | | | | | | |
|---|---|---|---|---|---|---|---|
| | $R_2T_{14}B$ phase | | | | | | |
| | Presence or absence of formation | Volume fraction (%) | a-Axis length (nm) | c-Axis length (nm) | Lattice volume ($nm^3$) | (c-Axis length)/(a-Axis length) | Density ($g/cm^3$) |
| Related-art Example 1 | Formed | 95.1 | 0.880 | 1.224 | 1.391 | 0.949 | 7.48 |

TABLE 2-continued

| | | | | | | | |
|---|---|---|---|---|---|---|---|
| Related-art Example 2 | Formed | 90.4 | 0.877 | 1.216 | 1.387 | 0.934 | 7.61 |
| Related-art Example 3 | Formed | 93.8 | 0.876 | 1.218 | 1.390 | 0.935 | 7.75 |
| Related-art Example 4 | Formed | 95.0 | 0.881 | 1.224 | 1.390 | 0.950 | 7.22 |
| Related-art Example 5 | Formed | 92.7 | 0.872 | 1.207 | 1.384 | 0.918 | 8.00 |
| Related-art Example 6 | Formed | 75.7 | 0.876 | 1.223 | 1.395 | 0.939 | 7.93 |
| Related-art Example 7 | Formed | 73.8 | 0.875 | 1.216 | 1.391 | 0.930 | 8.14 |
| Related-art Example 8 | Not formed | — | — | — | — | — | — |
| Related-art Example 9 | Formed | 97.4 | 0.877 | 1.212 | 1.382 | 0.932 | 7.45 |
| Related-art Example 10 | Formed | 92.1 | 0.879 | 1.217 | 1.385 | 0.941 | 7.35 |
| Related-art Example 11 | Formed | 90.3 | 0.877 | 1.229 | 1.402 | 0.945 | 7.60 |
| Related-art Example 12 | Formed | 91.1 | 0.874 | 1.224 | 1.401 | 0.934 | 7.86 |
| Related-art Example 13 | Formed | 97.1 | 0.879 | 1.225 | 1.393 | 0.947 | 7.37 |
| Related-art Example 14 | Formed | 95.4 | 0.878 | 1.220 | 1.388 | 0.941 | 7.58 |
| Related-art Example 15 | Formed | 94.9 | 0.875 | 1.208 | 1.381 | 0.924 | 7.73 |
| Related-art Example 16 | Formed | 94.3 | 0.879 | 1.218 | 1.386 | 0.942 | 7.28 |

| | Magnetic characteristic | | | |
|---|---|---|---|---|
| | 300K | | 453K | |
| | Saturation magnetization Ms (T) | Anisotropic magnetic field Ha (T) | Saturation magnetization Ms (T) | Anisotropic magneticfield Ha (T) |
| Related-art Example 1 | 1.48 | 5.28 | 1.18 | 2.71 |
| Related-art Example 2 | 1.33 | 3.73 | 1.21 | 2.33 |
| Related-art Example 3 | 1.29 | 2.38 | 1.17 | 1.71 |
| Related-art Example 4 | 1.49 | 5.74 | 1.22 | 2.93 |
| Related-art Example 5 | 1.35 | 5.68 | 1.22 | 2.33 |
| Related-art Example 6 | 0.98 | 2.62 | 0.77 | 1.44 |
| Related-art Example 7 | 0.89 | 2.04 | 0.65 | 1.31 |
| Related-art Example 8 | — | — | — | — |
| Related-art Example 9 | 1.18 | 3.21 | 0.70 | 1.00 |
| Related-art Example 10 | 1.36 | 5.46 | 1.01 | 2.96 |
| Related-art Example 11 | 1.31 | 4.22 | 1.14 | 2.38 |
| Related-art Example 12 | 1.25 | 4.36 | 1.14 | 2.26 |
| Related-art Example 13 | 1.30 | 2.45 | 0.92 | 1.66 |
| Related-art Example 14 | 1.30 | 4.31 | 0.95 | 2.30 |
| Related-art Example 15 | 1.20 | 2.57 | 0.96 | 1.63 |
| Related-art Example 16 | 1.41 | 5.89 | 1.11 | 1.83 |

From FIG. 2, it can be understood that in the sample of Comparative Example 8 ($Nd_2Fe_{14}B$ phase), the saturation magnetization is sharply decreased due to the rise in the temperature, but a part or all of Nd is substituted with La, and in the samples of Example 4 and Example 5 in which a part of Fe is substituted with Co, the saturation magnetization is gently decreased due to the rise in the temperature. Further, in FIG. 1, a broken line that connects Example 4 (a sample in which all of Nd are substituted with La and a part of Fe is substituted with Co) and Comparative Example 8 ($Nd_2Fe_{14}B$ phase) is a line in which the saturation magnetization at the high temperature is predicted to be decreased as the reduction rate of the usage amount of Nd and Pr (content ratio of La) is increased. In each of the samples of Examples 1 to 8, the saturation magnetization at the high temperature is equal to or higher than the value indicated by the broken line. From the above, it can be understood that in any of the samples of Examples 1 to 8, the decrease in the saturation magnetization at the high temperature is suppressed within a range in which there is no problem in practical use or the saturation magnetization at the high temperature is further improved.

On the other hand, from Table 2 and FIG. 1, it can be understood that in the samples of Comparative Examples 1 to 13, the phase having the $R_2T_{14}B$ type crystal structure is not formed, or even when the phase having the $R_2T_{14}B$ type crystal structure is formed, the saturation magnetization at the high temperature is not good. From the above, it can be understood that in the samples of Comparative Examples 1 to 13, a part of Nd is not substituted with La, or even when a part of Nd is substituted with La, the rate of substitution thereof is not appropriate, or a part of Fe is not substituted with Co, or even when a part of Fe is substituted with Co, the rate of substitution thereof is not appropriate.

From the above results, the effects of the magnetic material and the manufacturing method thereof disclosed in the present disclosure can be confirmed.

What is claimed is:

1. A magnetic material comprising a main phase having an $R_2T_{14}B$ type crystal structure where R is a rare earth element and T is a transition metal element, wherein the main phase has a composition represented by a molar ratio formula $Nd_{(1-x)}La_x)_2((Fe_{(1-z-w)}Co_z M_w))_{14}B$ where M is one or more elements that are not Fe, Co, Ni, a rare earth element, or an unavoidable impurity element, and wherein $0.25 \le x \le 0.609$, $0.15 \le z \le 0.40$, and $0 \le w \le 0.1$ are satisfied.

2. The magnetic material according to claim 1, wherein a volume fraction of the main phase is 80.0% to 100%.

3. The magnetic material according to claim 1, wherein a lattice volume of the main phase is 0.930 $nm^3$ to 0.955 $nm^3$.

4. The magnetic material according to claim 1, wherein a density of the main phase is 7.00 $g/cm^3$ to 7.90 $g/cm^3$.

5. The magnetic material according to claim 1, wherein $0.01 \le w \le 0.1$ is satisfied.

6. The magnetic material according to claim 5, wherein M is one or more of titanium (Ti), chromium (Cr), manganese (Mn), vanadium (V), molybdenum (Mo), tungsten (W), carbon (C), gallium (Ga), copper (Cu), or aluminum (Al).

7. The magnetic material according to claim 1, wherein w=0.

8. A manufacturing method of the magnetic material according to claim 1, the method comprising melting a raw material containing the elements constituting the main phase and solidifying the melted raw material.

9. The method according to claim 8, wherein an ingot obtained by melting the raw material and solidifying the melted raw material is subjected to heat treatment at 1273 K to 1573 K for 6 hours to 72 hours.

* * * * *